(12) United States Patent
Scherle et al.

(10) Patent No.: US 10,202,061 B2
(45) Date of Patent: Feb. 12, 2019

(54) DRIVER-FREE TRANSPORT VEHICLE FOR THE SAFE TRANSPORTATION OF HEAVY LOADS

(71) Applicant: GRENZEBACH MASCHINENBAU GMBH, Asbach-Bäumenheim (DE)

(72) Inventors: Mathias Scherle, Asbach-Bäumenheim (DE); Sigfried Mecklinger, Buchdorf (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 68 days.

(21) Appl. No.: 15/036,259

(22) PCT Filed: Dec. 10, 2014

(86) PCT No.: PCT/DE2014/000630
§ 371 (c)(1),
(2) Date: May 12, 2016

(87) PCT Pub. No.: WO2015/085988
PCT Pub. Date: Jun. 18, 2015

(65) Prior Publication Data
US 2016/0288687 A1    Oct. 6, 2016

(30) Foreign Application Priority Data
Dec. 12, 2013   (DE) .................. 10 2013 020 833

(51) Int. Cl.
*B60L 5/00*       (2006.01)
*B60P 1/64*       (2006.01)
(Continued)

(52) U.S. Cl.
CPC .............. *B60P 1/6409* (2013.01); *B60L 3/10* (2013.01); *B60L 5/005* (2013.01); *B66F 9/063* (2013.01); *B60L 2200/36* (2013.01)

(58) Field of Classification Search
CPC ........ B60L 3/10; B60L 5/005; B60L 2200/36; B66F 9/063; B60P 1/6409
See application file for complete search history.

(56) References Cited

U.S. PATENT DOCUMENTS 2,380,152 A * 7/1945 David .................... B66F 3/247
254/93 HP
2,873,820 A * 2/1959 Rizzuto .................... B62B 5/04
188/20

(Continued)

FOREIGN PATENT DOCUMENTS

DE   4433786    3/1996
DE   69901363   1/2003

(Continued)

OTHER PUBLICATIONS

Gunter Ullrich, "Geschichte der Fahrerlosen Transportsysteme" Springer Fachmedien Wiesbaden GmbH: Vieweg + Teubner Verlag, 2011, ISBN 978-3-8348-0791-5. English translation of German Office Action dated Dec. 18, 2014, received in corresponding German Application No. 10 2013 020 851.3, discussing Ullrich (D2) on p. 5.

*Primary Examiner* — James A Shriver, II
*Assistant Examiner* — Vaughn Coolman
(74) *Attorney, Agent, or Firm* — Duane Morris LLP; Gregory M. Lefkowitz; Jason M. Nolan (57) ABSTRACT

The invention relates to a driver-free transport vehicle and to a method for the safe transportation of heavy loads which are in the form of loaded carriages which can be moved on castors, said vehicle having the following characteristics: a) vehicle housing having a central lifting mandrel for receiving and transporting a carriage by means of a docking traverse, with two drive wheels arranged on both sides of the vehicle housing, and in the center thereof, and at least one laser scanner system which is installed in the outer area of (Continued)

the vehicle housing; b) a drive motor for driving a hub spindle which presses, by means of a compression spring, the central lifting mandrel in a central opening of the docking traverse, and a system for supplying energy of the transport vehicle via inductive lines laid in the ground, by means of an induction current collector, is provided; c) an emergency stop system which comprises an emergency switch on the transport vehicle, the activation on the emergency stop switches triggering on each castor of the carriage, the simultaneous locking of a pressurized brake shoe.

12 Claims, 7 Drawing Sheets

(51) Int. Cl.
  *B66F 9/06* (2006.01)
  *B60L 3/10* (2006.01)

(56) References Cited

U.S. PATENT DOCUMENTS

| | | | | |
|---|---|---|---|---|
| 3,380,546 A * | 4/1968 | Rabjohn | ............. | B60L 11/1805 180/15 |
| 3,651,894 A * | 3/1972 | Auriemma | ................ | B62B 5/04 188/169 |
| 3,730,481 A * | 5/1973 | Ekonen | ................... | B66F 3/247 254/93 R |
| 3,847,089 A * | 11/1974 | Nelson | ................... | B60L 15/005 104/291 |
| 3,986,582 A * | 10/1976 | Dye | .......................... | B62B 5/04 188/31 |
| 4,248,445 A * | 2/1981 | Vassar | ................... | B60B 33/021 16/35 R |
| 4,277,996 A * | 7/1981 | Spengler | ................ | B23Q 5/033 100/269.03 |
| 4,286,490 A * | 9/1981 | Spengler | ................. | B26D 5/12 100/269.03 |
| 4,526,253 A * | 7/1985 | Schmidt | .............. | B60B 33/0042 16/35 R |
| 5,242,035 A * | 9/1993 | Lange | ................. | B60B 33/021 16/35 R |
| 5,244,062 A * | 9/1993 | Felton | ....................... | B62B 5/04 16/35 R |
| 5,445,233 A * | 8/1995 | Fernie | .................... | A61G 5/043 180/6.5 |
| 5,525,884 A * | 6/1996 | Sugiura | ................ | G05D 1/0261 180/168 |
| 5,579,871 A * | 12/1996 | Emmrich | ............ | B60B 33/0042 16/35 R |
| 5,634,532 A * | 6/1997 | Bucher | .................... | B62B 5/04 188/1.12 |
| 5,774,936 A * | 7/1998 | Vetter | .................... | B60B 33/021 16/35 R |
| 5,899,469 A * | 5/1999 | Pinto | ........................ | B62B 3/001 16/35 R |
| 5,979,917 A * | 11/1999 | Thogersen | .......... | B60B 33/0018 188/19 |
| 5,988,306 A * | 11/1999 | Ooishi | ..................... | B62D 1/28 180/168 |
| 6,209,670 B1 * | 4/2001 | Fernie | .................... | A61G 5/043 180/11 |
| 6,347,573 B1 * | 2/2002 | Henkel | ................. | F16F 9/0245 92/13.51 |
| 6,409,187 B1 * | 6/2002 | Crow, Jr. | .................... | B62B 5/04 188/20 |
| 6,469,466 B1 * | 10/2002 | Suzuki | ................... | B60G 17/04 318/580 |
| 6,481,521 B2 * | 11/2002 | Sugiyama | ............... | B61B 10/04 180/168 |
| 6,564,890 B2 * | 5/2003 | Coveyou | ............... | B62D 53/005 180/19.1 |
| 6,843,349 B2 * | 1/2005 | Walsh | ................. | B60B 33/0018 16/35 R |
| 7,011,188 B2 * | 3/2006 | Scheuring, III | ........ | B60T 7/085 188/156 |
| 7,017,228 B2 * | 3/2006 | Silverstein | .......... | B60B 33/0005 16/18 R |
| 7,182,178 B2 * | 2/2007 | Chung | ................ | B60B 33/0018 188/1.12 |
| 7,604,219 B2 * | 10/2009 | Liljedahl | ................... | B66F 3/28 254/102 |
| 7,712,184 B1 * | 5/2010 | Lewis | ................. | B60B 33/0039 16/18 R |
| 7,850,413 B2 * | 12/2010 | Fontana | .................... | B66F 3/08 414/331.14 |
| 7,905,304 B2 * | 3/2011 | Adachi | ................... | B66F 9/063 180/12 |
| 8,146,702 B2 * | 4/2012 | Schendel | .................. | B60T 7/22 180/274 |
| 8,191,909 B2 * | 6/2012 | Livengood | ............... | A61H 3/04 188/19 |
| 8,528,487 B2 * | 9/2013 | Shapery | .................. | B60L 5/005 104/287 |
| 8,672,081 B2 * | 3/2014 | Kume | .................. | B62B 5/0026 180/19.1 |
| 9,056,577 B2 * | 6/2015 | Corrigan | ............... | B60P 1/52 |
| 9,061,547 B2 * | 6/2015 | Shih | ...................... | B60B 33/025 |
| 9,436,184 B2 * | 9/2016 | D'Andrea | ............... | B66F 9/063 |
| 9,707,879 B2 * | 7/2017 | Mecklinger | ............... | B60P 1/02 |
| 10,077,176 B2 * | 9/2018 | Herre | ...................... | B66F 9/063 |
| 2005/0019146 A1 * | 1/2005 | Burger | ............... | H05K 13/0482 414/752.1 |
| 2006/0210382 A1 * | 9/2006 | Mountz | .................. | B60D 1/465 414/498 |
| 2006/0267530 A1 * | 11/2006 | Burke, Jr. | ................. | B60L 5/42 318/432 |
| 2008/0083345 A1 * | 4/2008 | Morita | ................... | B62D 1/265 104/106 |
| 2008/0166217 A1 | 7/2008 | Fontana | | |
| 2011/0077814 A1 | 3/2011 | Haberer | | |
| 2011/0162141 A1 * | 7/2011 | Lemire | ................... | A61G 7/005 5/510 |
| 2011/0303818 A1 * | 12/2011 | Bach | ....................... | A47C 3/22 248/571 |
| 2012/0161696 A1 * | 6/2012 | Cook | .................... | B60L 11/182 320/108 |
| 2013/0139717 A1 * | 6/2013 | Smith | ..................... | B60L 13/10 104/282 |
| 2013/0177379 A1 * | 7/2013 | Hoffman | ................ | B65G 57/00 414/791.6 |
| 2013/0206923 A1 * | 8/2013 | Gatterbauer | ................ | B21C 47/24 246/186 |
| 2016/0167557 A1 * | 6/2016 | Mecklinger | ............ | B66F 9/063 414/495 |
| 2017/0225602 A1 * | 8/2017 | Corrigan | ................... | B60P 1/52 |

FOREIGN PATENT DOCUMENTS

| | | |
|---|---|---|
| DE | 10146465 | 4/2003 |
| DE | 10238759 | 3/2004 |
| DE | 102005049159 | 5/2006 |
| DE | 102011110196 | 2/2013 |
| DE | 202013007279 | 11/2013 |
| JP | H0811741 A * | 1/1996 ............. B62D 15/00 |

* cited by examiner

DRIVER-FREE TRANSPORT VEHICLE FOR THE SAFE TRANSPORTATION OF HEAVY LOADS

CROSS-REFERENCE TO RELATED APPLICATIONS

This application is a § 371 national stage entry of International Application No. PCT/DE2014/000630, filed Dec. 10, 2014, which claims priority to German Patent Application No. 10 2013 020 833.5 filed Dec. 12, 2013, the entire contents of which are incorporated herein by reference.

The invention relates to a driverless transport vehicle for the safe transportation of heavy loads.

The requirement of short throughput times, low inventory, and high flexibility in production and distribution operations has existed for many years. Various types of organizational measures and the employment of technical means are required in order for these objectives to be met. Within the remit of operational logistics, it is the processes and the operating resources of intra-plant material flow that have to be designed in a suitable manner. Transporting, that is to say the targeted locational modification of goods, is an important process in the material flow. An operating resource which because of its universal application potential is used for this purpose in many enterprises is the conventional fork-lift truck or the fork-lift carriage.

Automation of the transport process is enabled by installing driverless transport systems. Driverless transport systems are intra-plant transport systems having automatically controlled vehicles which serve for transporting materials.

A control system for an automatically guided vehicle (AGV) is known in the prior art from DE 699 01 363 T2, said control system being based on the objective of providing a guiding system for automatically guided vehicles that is improved in relation to the prior art. Furthermore, it is the intention to provide an AGV guiding system which uses a first guiding mechanism for guiding the AGV along high-speed sections of the path, and a second guiding system for guiding the AGV along low-speed sections of the path.

In this publication, a guiding system for guiding an AGV, having the following features is claimed:

A multiplicity of non-adjacent rail segments; a steering mechanism for guiding the AGV along the rail segments; and an electronic control unit for guiding the AGV between the rail segments, the electronic control unit steering the AGV from one rail segment to one of the other rail segments.

A mobile unit based on the objective of refining a mobile unit, wherein simple handling is to be achieved, in particular servicing of the drive or of the electronics is intended to be able to be carried out in a simple manner is furthermore known from DE 10 2011 110 196 A1.

For this purpose, a mobile unit which has an electronics unit and a receptacle unit, in particular a receptacle plate, is to be granted protection, wherein the electronics unit has an electric drive, in particular comprising an electric motor, and drive rollers which are drivable by the electric drive, for moving the mobile unit along a translational motion area, in particular thus along a translational motion planar portion.

This mobile unit is characterized in that the receptacle unit is supported and/or movable by means of rollers, in particular casters, for moving the receptacle part along the translational motion area, in particular thus along the floor, in particular in various directions, the electronics unit being rotatably mounted on the receptacle unit, wherein in particular the rotational axle is mounted so as to be perpendicular to the translational motion area.

It is the object of the present invention to provide an autonomous transport vehicle by way of which the rapid and above all safe transportation of load shelves having loads up to more than 1000 kg may be executed in an interference-free manner in large factory sheds, even in the case of slight inclinations.

This object is achieved by a device according to claim 1: a driverless transport vehicle for the safe transportation of heavy loads in the form of loaded carriages which are movable on casters, the transport vehicle having the following features:
  a) a vehicle housing (40) having a central lifting pin (15), a left lifting pin (28), and a right lifting pin (20) for receiving and transporting a carriage (1) by means of a docking cross beam (5) which is integrated in the carriage (1), having two drive wheels (7) which, each on a dedicated mounted rotation axle, are separately driven on either side of the center of the vehicle housing (40) by one drive (16) each, wherein a rotary encoder (33) is provided on each drive wheel (7), and wherein support wheels (19) in each case in pairs are provided on the front side and on the rear side of the vehicle housing (40), and wherein at least one laser scanner (2) is installed in the external region of the vehicle housing (40);
  b) a drive motor for driving a lifting spindle (23) which by means of a pressure spring (34) presses the central lifting pin (20) into a central opening of the docking cross beam (5), and by means of a pressure plate (27) presses the left lifting pin (28) and the right lifting pin (20) into corresponding further openings of the docking cross beam (5), wherein a system for supplying energy to the transport vehicle by means of an induction current pick-up (39) by way of inductive lines which are installed in the floor is provided;
  c) an emergency-stop system which has emergency off-switches (9) on the transport vehicle, and emergency off-switches (8) on the carriage (1), the locking of a pressure-loaded brake shoe (45) on each caster (3) of the carriage (1) being simultaneously released upon actuation of the emergency off-switches.

claim 2: the transport vehicle as claimed in claim 1, characterized in that the docking cross beam (5) has a docking cross brace (6) which enables receiving of the carriage (1) in a position of the transport vehicle that is rotated about a right angle.

claim 3: the transport vehicle as claimed in claim 1 or 2, characterized in that the pressure spring (34) concentrically encloses a further internal pressure spring (32) which enables higher contact pressure on the carriage (1).

claim 4: the transport vehicle as claimed in claim 1, 2, or 3, characterized in that deceleration of a transport vehicle is also possible by means of a manually actuated brake (37, 42).

claim 5: the transport vehicle as claimed in one of claims 1 to 4, characterized in that the calculation of the slippage on each drive wheel (7) is performed by means of a laser scanner (2) in conjunction with a rotary encoder (33) on each drive wheel.

or, respectively, by the method according to claim 6: a method for operating a driverless transport vehicle for the safe transportation of heavy loads in the form of loaded carriages which are movable on casters, the method having the following features:

a) using a vehicle housing (40) having a central lifting pin (15), a left lifting pin (28), and a right lifting pin (20) for receiving and transporting a carriage (1) by means of a docking cross beam (5) which is integrated in the carriage (1), having two drive wheels (7) which, each on an independently mounted rotation axle, are separately driven on either side of the center of the vehicle housing (38) by one drive (16) each;

b) moving the vehicle housing (40) below a carriage (1), determining openings in the region of the docking cross beam (5), and deploying the lifting pin (15), the left lifting pin (28), and the right lifting pin (20) into these openings, at least one laser scanner (2) serving for orientation;

c) triggering an emergency stop by means of an emergency off-switch (8, 9) in the case of danger and/or for testing, and releasing the brakes prior to onward travel;

d) transporting the carriage (1) onward to the destination, releasing the mechanical connection between the vehicle housing (38) and the carriage (1).

claim 7: the method as claimed in claim 6, characterized in that the contact pressure of the lifting pins (28, 15, 20) depends on the payload of the carriage (1).

claim 8: the method as claimed in claim 6 or 7, characterized in that the docking cross beam (5) has a docking cross brace (6) which allows alignment of a carriage (1) in two mutually perpendicular directions.

claim 9: the method as claimed in one of claims 6 to 8, characterized in that the weight of the payload is determined by means of measuring the acceleration and/or the starting current of the laden transport vehicle.

claim 10: the method as claimed in one of claims 6 to 9, characterized in that the calculation of the slippage on each drive wheel (7) is performed by means of a laser scanner (2) in conjunction with a rotary encoder (33) on each drive wheel.

claim 11: a computer program having a programming code for carrying out the method steps as claimed in one of claims 6 to 10, if the program is executed using a computer.

claim 12: a machine-readable carrier having the programming code of a computer program for carrying out the method as claimed in one of claims 6 to 10, if the program is executed using a computer.

The device according to the invention will be described in more detail hereunder. In the figures, and in detail.

Figure 1:
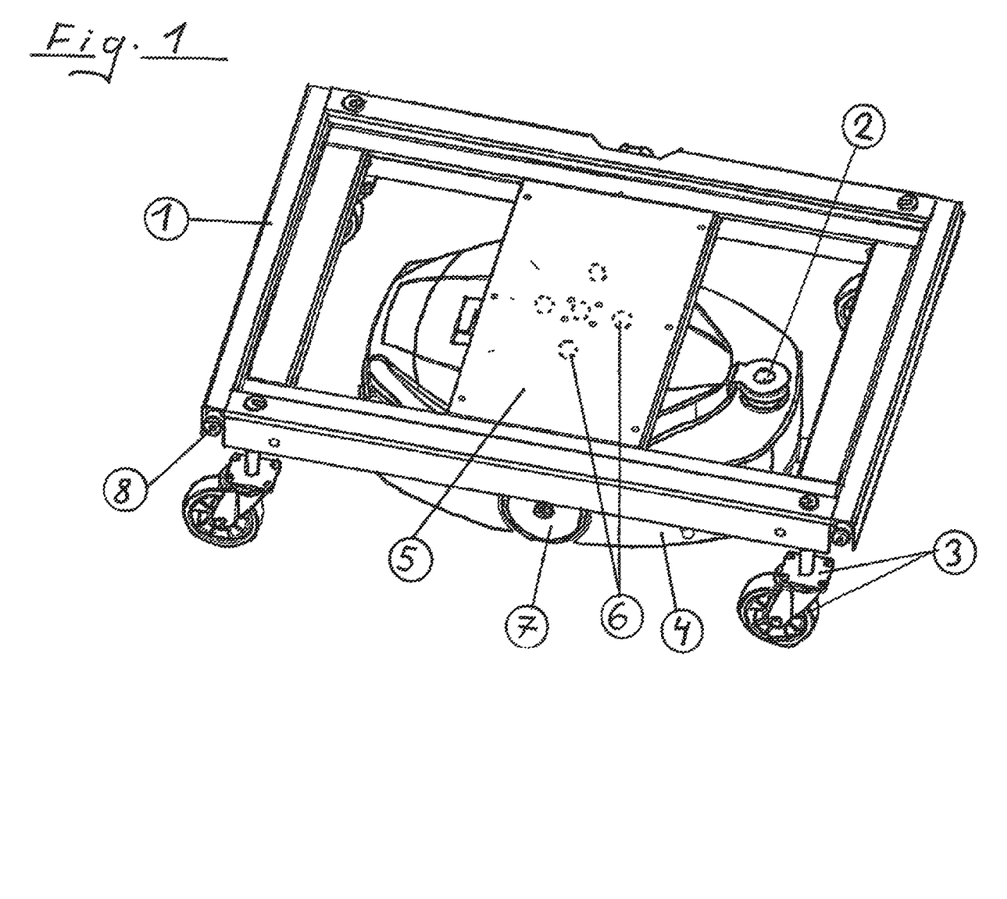
FIG. 1 shows a perspective view of a transport vehicle 4.

FIG. 1 shows a perspective view of a transport vehicle 4 having a carriage 1 bearing thereon. The carriage 1, in the region of the center of gravity thereof, is connected to a rectangular docking cross beam 5 which, in the point of intersection of the face diagonals thereof, has a bore which, in the direction of the longitudinal side of the this rectangle and in the direction of the transverse side, is on either side accompanied by in each case one other bore. These five bores form a cross brace which is referred to as the docking cross brace, since the transport vehicle 1 has means by way of which a force-fitting connection as a docking facility to the carriage 1 is established by plugs in the form of three lifting pins, which slide into these bores. The centers of these three lifting pins, that is to say of a left, of a central, and of a right lifting pin, lie on one line, the central lifting pin penetrating the bore in the point of intersection of the face diagonals of the docking cross beam 5. Since the five bores described allow the three docking pins to dock in two directions which are mutually perpendicular, the transport vehicle 4 is capable of receiving a carriage 1 in the longitudinal direction or in the transverse direction. A laser scanner on the upper front side of the transport vehicle 4 shown, that serves for orientation, is referenced as 2. The right drive wheel of the transport vehicle 4, that is visible here, is referenced as 7, and the casters of the carriage 1 are referenced as 3. An emergency off-switch which is installed on all four corners of a carriage 1 is referenced as 8.

Figure 2:
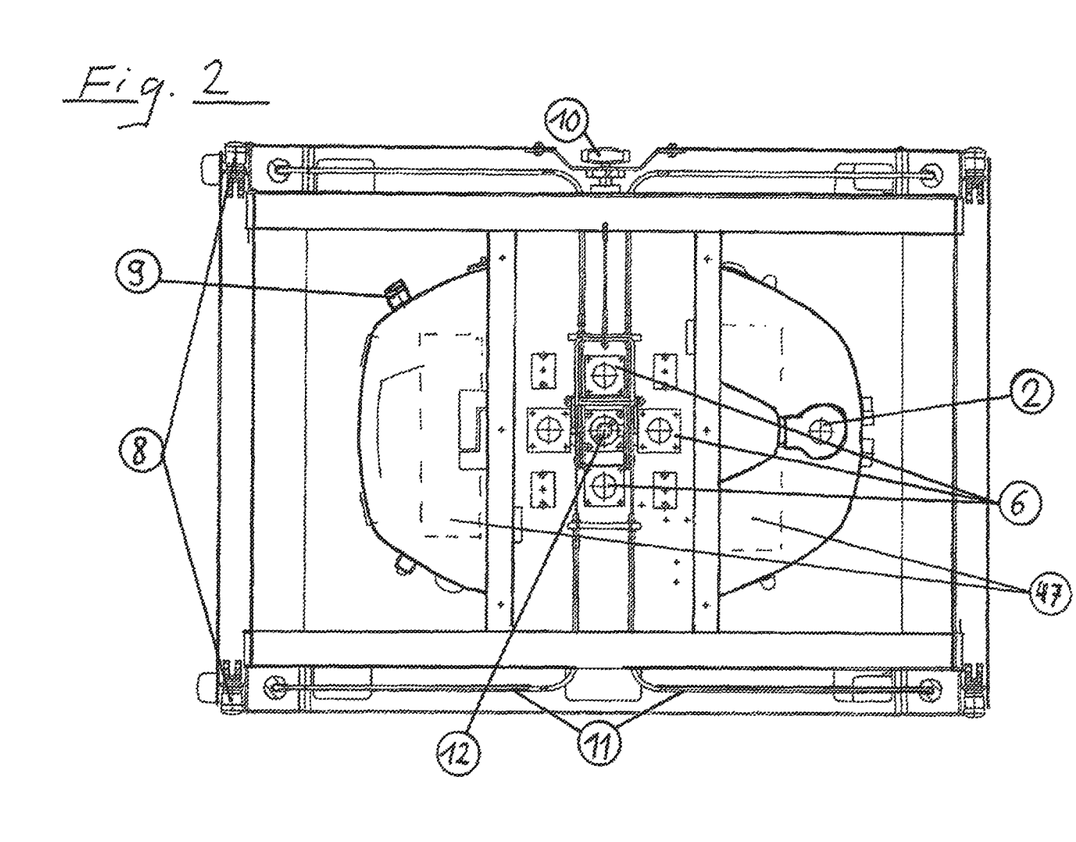
FIG. 2 shows a plan view of a transport vehicle 4 and of a carriage.

FIG. 2 shows a plan view of a transport vehicle 4 and of a carriage having four emergency off-switches for each of the four casters, two emergency off-switches on the left side being referenced as 8.

The drawing shown here allows the docking head 12 for the central lifting pin to be identified, said docking head 12 being important for triggering a braking procedure and being visible in the center on a carriage, in the region of the docking cross brace 6. FIG. 2 furthermore serves for illustrating the profile of brake cables 11 in the carriage, said brake cables 11, proceeding from the docking head 12, each leading to one caster 3. A further emergency off-switch 9 which by way of respective contacts is connected to the brake system is located on the transport vehicle on which the laser scanner 2 is also referenced. A manually actuatable hand wheel 10 serves inter alia for resetting the brake which, following the triggering of a braking procedure, is triggered on each caster. Reference is made to the description of FIG. 4 with a view to a more detailed explanation of the functioning of the brakes on the carriage. For the sake of completeness, the spaces 47 for receiving power storage units, for example in the form of electrical accumulators, are also shown.

Figure 3:
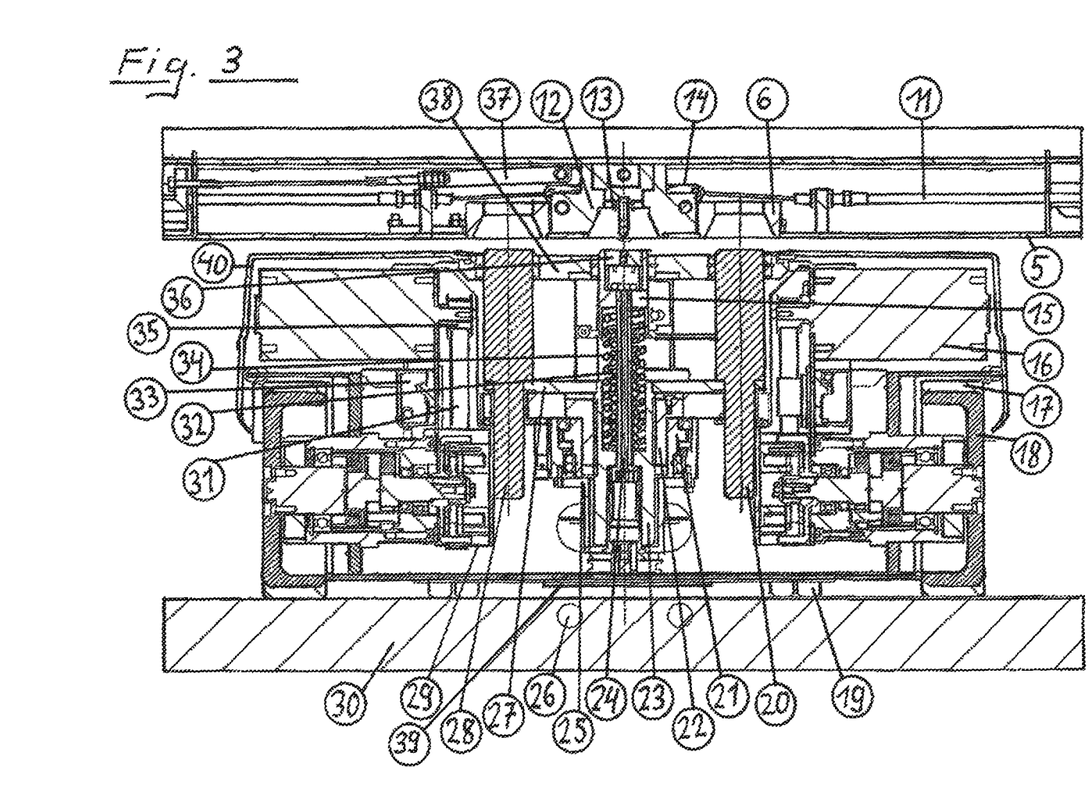
FIG. 3 shows a cross section of a transport vehicle on the floor.

FIG. 3 shows a cross section of a transport vehicle on the floor, a carriage in the correct position but without any mechanical connection being visible thereabove in this example. This clarifies the assignment of the connection elements between the transport vehicle and the carriage concerned.

Here, the central lifting pin 15, having an external pressure spring 34, an internal pressure spring 32, and a guide tube 24 which runs concentrically with the longitudinal axis of these two springs, can be seen in the center. A gear wheel 21 drives a spindle nut 22, setting the latter in rotation. A vertical movement of a lifting spindle 23 having a pressure plate 27 is performed by rotating the spindle nut 22. An upward movement of the lifting pin 15 is performed by way of the lifting spindle 23 having the pressure spring 34 which presses onto the lifting pin 15, said pressure spring 34 being delimited in the length thereof by the guide tube 24.

The downward movement of the lifting spindle 23 having the pressure plate 27 and the external lifting pins 28 and 20 is performed by turning the spindle nut 22 in the opposite direction. The lower delimitation of the guide tube 24, by further lowering of the lifting spindle 23, abuts an annular stop which is provided in the interior of the lifting spindle 23. On account thereof, the pressure spring 34 is delimited, the lifting pin 15 by further lowering of the lifting spindle 23 being imparted a downward movement. The lifting pin 15 thus is released from the docking cross beam 5 as the last of the lifting pins. This means additional safety in the case of an emergency stop.

The contact between the transport vehicle and the docking cross beam 5 of the carriage is caused by means of the central lifting pin 15 pushing vertically upward. The spindle nut 22 is disposed so as to be concentric with an external thread which is machined onto the entire length of the lifting spindle 23 and into which external thread said spindle nut 22 engages. Driving the gear wheel 21 is performed by means of a drive motor, the drive sprocket of which being engaged with the gear wheel 21 by way of reduction gear wheels. The drive motor, the drive sprocket, and the reduction gear wheels are obscured in FIG. 3 and can therefore not be seen.

Employment of the two pressure springs 34 and 32 enables the pressure by way of which the central lifting pin 15 supports the carriage to be designed in a variable manner. For example, in this way the pressure which is exerted by way of the external pressure spring 34 on the docking cross beam 5, and thus on the carriage, may be varied between a payload rating of zero and 400 kp. If the pressure is further increased, the internal pressure spring which allows the pressure force to be modified between a payload rating of 400 kp and 1000 kp, for example, is employed.

In this way, the proportion of the payload on the carriage to be transported that bears on the drive wheels of the transport vehicle may be adapted to the respective circumstances of the floor. Indeed, in this way the drive output of the transport vehicle may not only be adapted to the entire payload to be transported but also to the floor conditions and to the loading capability of the drive wheels. These measures have a significant influence on the braking behavior of the loaded transport vehicle.

Using the system described, upward or downward inclines of the floor area of up to 5% may be overcome.

The induction line 26, the associated induction current pick-up 39, and the support wheels 19 are disposed in the region close to the carriageway 30.

The vehicle housing is referenced as 40 on the left side of FIG. 3. A drive which, like on the right side, is referenced as 16, by way of a drive wheel 25 and a first timing belt 31 and a timing-belt wheel 29 drives a drive wheel having a drive-wheel rim 18 and a drive-wheel tire 17. The latter are referenced on the right side. A rotary encoder 33 of a drive wheel 7 is illustrated in the region of the left drive wheel of the transport vehicle. The calculation of the slippage on each drive wheel (7) is possible by said rotary encoder 33 in conjunction with a laser scanner (2).

The guide plate 38 for the left and the right lifting pin can be seen in the upper region of the central lifting pin.

In the region of a carriage disposed thereabove, the docking head to carriage 12 for the central lifting pin, having a contact plate 13, is shown.

Figure 4:
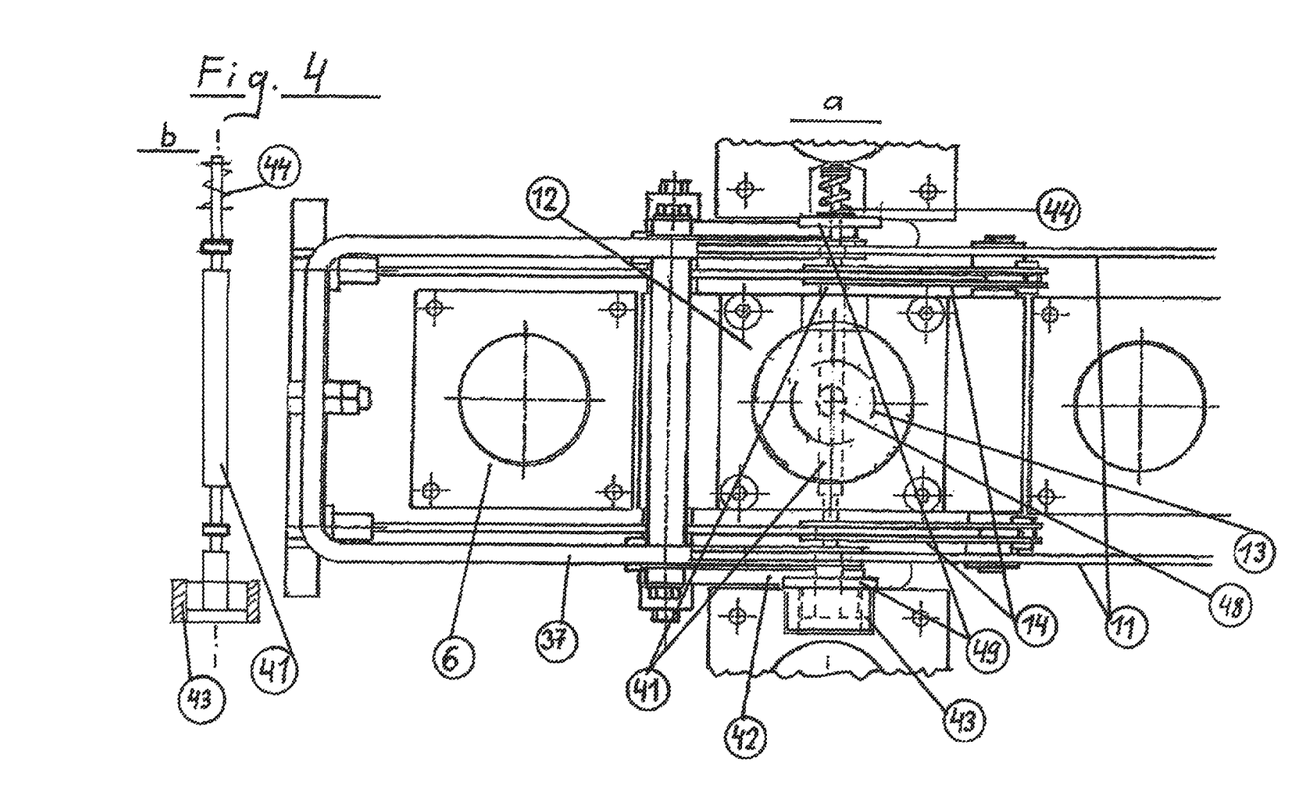
FIG. 4 shows a plan view of the brake installation of the carriage.

The brake cables 11 and the shift lever 14 for cable brakes, which are furthermore shown in this region in FIG. 3, together with the traction installation 37 are described in more detail in FIG. 4.

FIG. 4, in the part a thereof, shows a plan view of the brake installation of the carriage. Here, the region around the docking head to carriage 12 for the central lifting pin of FIG. 2 has been rotated about a right angle and is illustrated in an enlarged detail. This docking head 12 is the central part of the docking cross brace 6, the contact plate 13, known from FIG. 3, being also shown in the center thereof. The complementary plates to this docking cross brace 6 can be seen in a cutaway illustration above and below the center shown.

The function of the brake installation shown lies in releasing a lock which usually exists on each caster of the carriage, by way of manual intervention, for example by actuating an emergency off-switch. This lock in the form of a cable brake which engages on one of the shift levers 14, prevents a braking shoe decelerating, said brake shoe acting by spring pressure on the caster.

For this purpose, a shifting and lifting axle 41, which is disposed so as to be transverse to the position of the three lifting pins shown, is provided between a resetting spring 44 in the upper region of the image and an electromagnetic actuator 43 in the lower region of the image. This shifting and lifting axle 41 in the normal position makes sure that four shift levers 14 for cable brakes on each of the four casters on the carriage, in the normal position thereof, in turn prevent the respective brake shoe exercising its braking effect. This is achieved in that each of the four shift levers 14 by way of brake cables 11 is exposed to the traction force of a brake spring on each caster, on the one hand, but in the slot-shaped engagement region of said shift lever 14 is held on the shifting and lifting axle 41 by means of a thickening of the cross section of this axle, on the other hand.

If the shifting and lifting axle 41 in terms of the longitudinal axis thereof is now displaced such that the four shift levers 14 find their way into a non-thickened region of the shifting and lifting axle 41, said shift levers 14 no longer find purchase on this axle, the disturbed equilibrium on the four switch levers 14 allowing the latter to rotate about their rotation axes and to follow the traction force of the respective brake cable 11. This, by way of the brake cables 11, abruptly triggers locking of the brake shoes on the four casters since each of the four brake shoes is pressed onto the respective caster by a pressure spring which is disposed there.

Displacement of the shifting and lifting axle 41 may be performed, for example, by actuating an emergency off-switch and by triggering the electromagnetic actuator 43, the latter being caused by the said emergency off-switch and by way of a short jolt displacing the shifting and lifting axle 11.

Once the four shift levers 14 have been disengaged, the shifting and lifting axle 41, by means of the resetting spring 44, is pushed back to the initial position thereof.

In order for this procedure to be clarified, the shifting and lifting axle 41 has been specifically drawn in a dedicated manner in the installation position thereof in part b of FIG. 4. The resetting spring 44 is shown again in the upper region, and the electromagnetic actuator 43 is again shown in the lower region. An external guide web 49 having in each case one slot serves for guiding the shifting and lifting axle 41 at each of the two mounting points of the latter.

Since, following an emergency stop, the shifting and lifting axle 41 may be pressed back to the initial position thereof, a resetting bolt 48 is provided for this purpose. A traction installation 37 and a respective shift lever 42 serve for manually actuating the brake installation.

Figure 5:
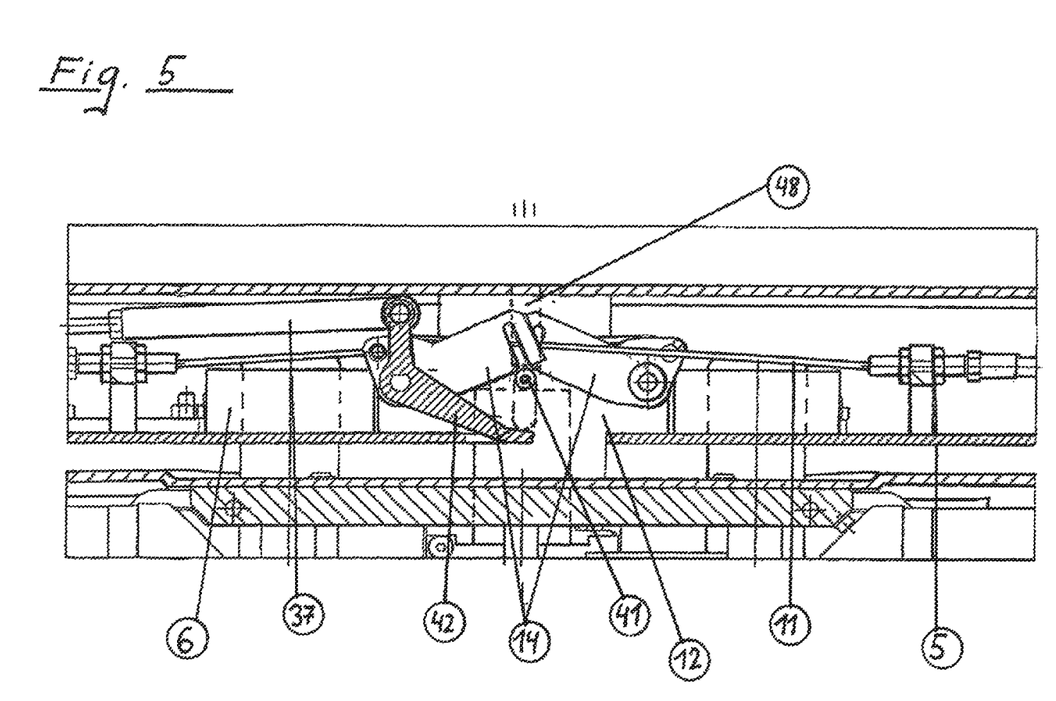
FIG. 5 shows a cross section through the brake installation.

FIG. 5 shows a cross section through the brake installation in a carriage. Here, the docking cross brace 6 and the cross beam 5 can be seen, and a brake cable 11 is referenced on the right side. The shift levers 14 are shown in the opened position in the region of the docking head to carriage 12, above the shifting and lifting axle 41. In this view, the resetting bolt 48 can be seen in the longitudinal section. The traction installation 37 and the associated shift lever 42 can be clearly seen here.

Figure 6A:
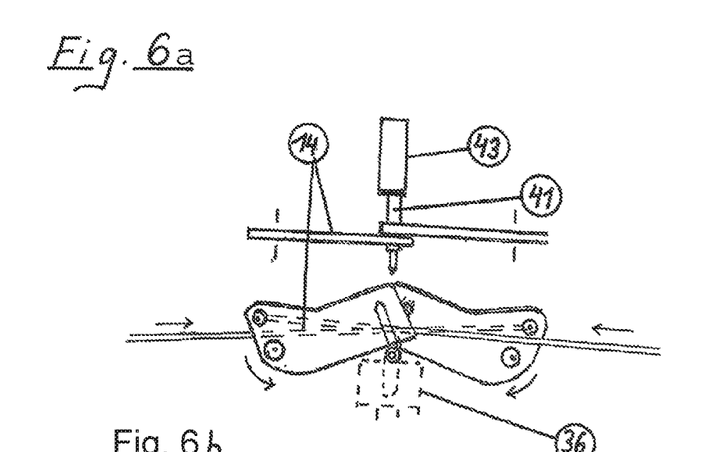
FIG. 6a shows an illustration of the functioning of the shift lever 14 from above.
Figure 6B:
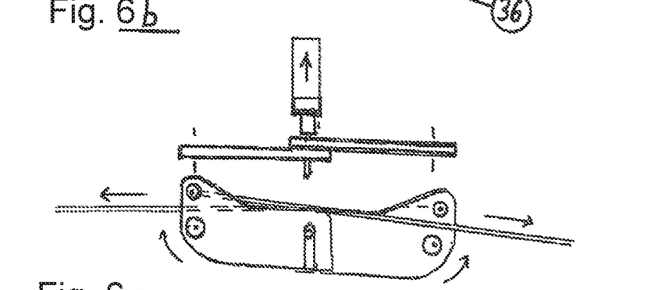
FIG. 6b shows an illustration of the functioning of the shift lever 14 in which the electromagnetic actuator has been triggered.
Figure 6C:
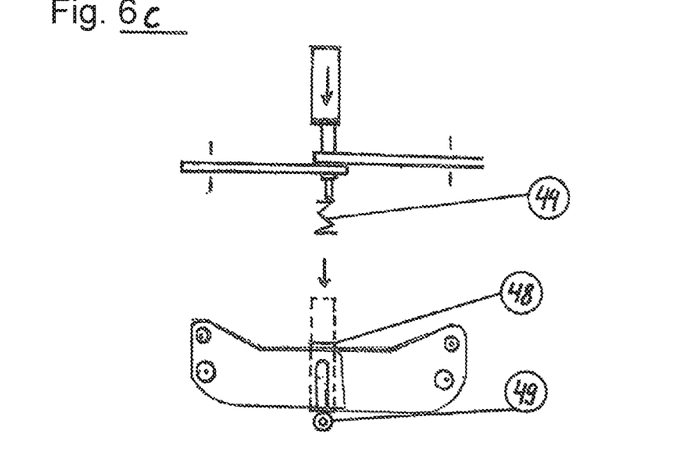
FIG. 6c shows an illustration of the functioning of the shift lever 14 being pushed downward.

FIGS. 6a, 6b and 6c show illustrations of the functioning of the shift lever 14.

The shifting and lifting axle 41 in FIG. 6a is shown from above, in conjunction with the electromagnetic actuator 43 and two actuating levers 14, the rotation axes thereof being indicated, the same two shift levers 14 in the section being visible therebelow. It can be seen here that the shifting and lifting axle 41 is pushed upwards by the contact plate 36 of the lifting pin, so as to correspond to the requirements of the payload bearing thereon, the shift levers 14 being located in the region of the thickening of the shifting and lifting axle 41. The slot in the shift levers 14 therefore has no effect.

The situation in which the electromagnetic actuator 43 has attracted the shifting and lifting axle 41, for example because of an emergency stop having been triggered, is illustrated in FIG. 6b. The shift levers are located in the narrow region of this axle such that the traction of the brake cables no longer meets with any resistance, because the slot in the respective shift lever, having been instigated by a brake spring on the caster concerned, may slide across the narrow point of the shifting and lifting axle 41. The result thereof is that the pressure spring on the brake shoe of the respective caster no longer meets with any resistance, pressing the brake shoe concerned onto the caster.

The shifting and lifting axle 41 in FIG. 6c is again pushed downward by a resetting bolt 48 and is pulled by the resetting spring 44 back to the initial position again, the shift levers 14 being likewise pressed back to the initial position thereof by the contact plate 36 for the lifting pin, thereby releasing the brake shoes.

Figure 7:
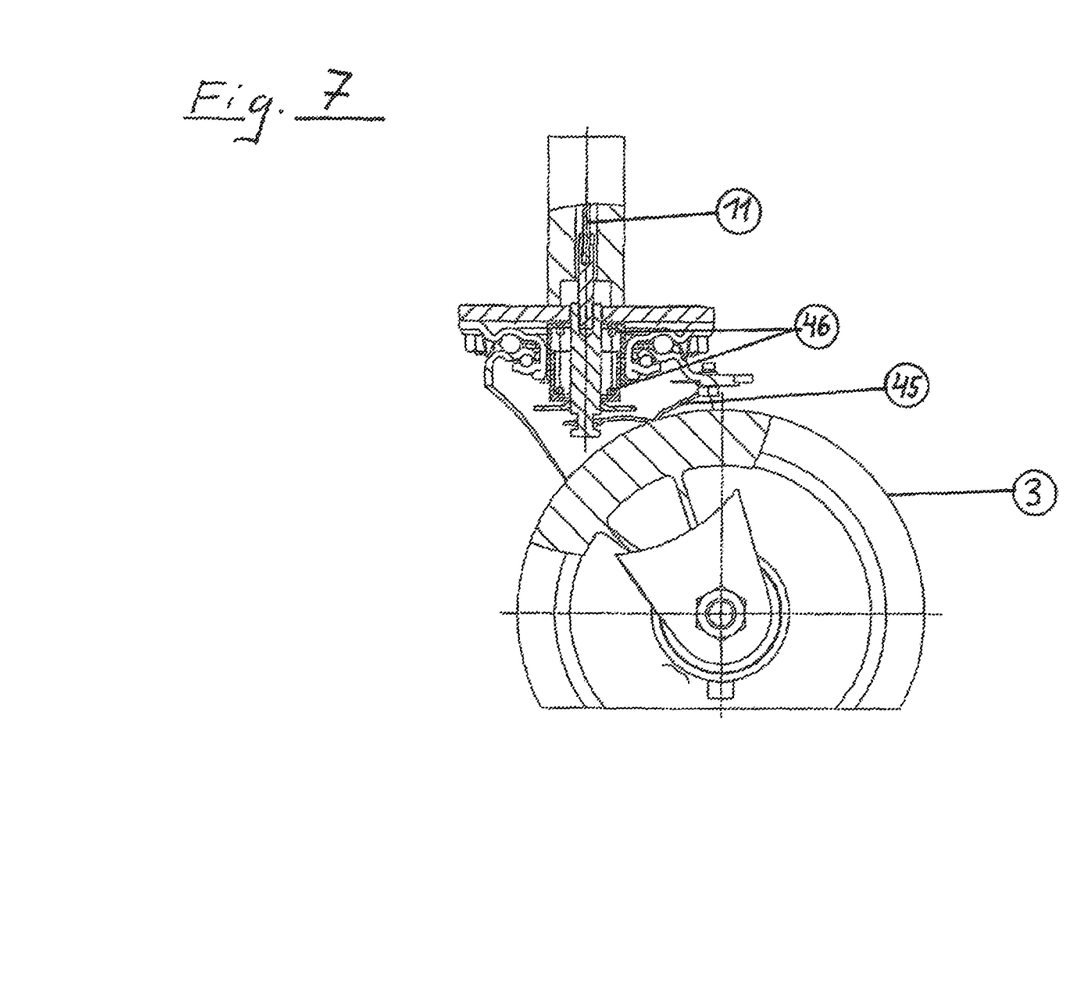
FIG. 7 shows a cross section through a caster 3.

FIG. 7 shows a cross section through a caster 3. It can be clearly seen how a brake spring 46 presses a brake shoe 45 onto a caster 3 when said brake spring 36 is not prevented from doing so by a brake cable 11.

A controlling and measuring apparatus 50, which is not illustrated in any of the figures, is furthermore located in the transport vehicle, the former having the following function.

This measuring apparatus, in the case of an expedient, brief and temporally limited acceleration from standstill, enables the acceleration to be measured and thus, while considering specific parameters, allows conclusions relating to the accelerated mass to be drawn. On the other hand, the starting currents, which have been measured with specific payloads of the carriage, may be determined in earlier series of measurements on a planar floor, and respective conclusions may later be drawn solely by measuring the starting current in the case of an unknown payload.

Controlling the complex motion procedures and signal processing of the sensors used requires a special control program.

LIST OF REFERENCE SIGNS

1 Carriage
2 Laser scanner
3 Caster
4 Transport vehicle
5 Docking cross beam
6 Docking cross brace
7 Drive wheel
8 Emergency off-switch of carriage
9 Emergency off-switch on the transport vehicle
10 Hand wheel for manual operation of the brake
11 Brake cables (brake lines)
12 Docking head to carriage, for the central lifting pin
13 Contact plate of the carriage
14 Shift lever for cable brakes
15 Central lifting pin
16 Drive for a drive wheel
17 Drive wheel—tire
18 Drive wheel—rim
19 Support wheel
20 Right lifting pin
21 Gear wheel for driving the spindle nut 22
22 Spindle nut
23 Lifting spindle
24 Guide tube for the internal pressure spring 32 and the external pressure spring 34
25 Housing for the lifting spindle 28
26 Induction lines
27 Pressure plate of the left and right lifting pin
28 Left lifting pin
29 Timing-belt drive for driving a drive wheel
30 Carriageway
31 Timing belt
32 Internal pressure spring
33 Rotary encoder of a drive wheel 7
34 External pressure spring
35 Drive wheel for the timing belt 31
36 Contact plate of lifting pin
37 Traction installation for manual operation of the brake
38 Guide plate for the left and right lifting pin
39 Induction current pick-up
40 Vehicle housing
41 Shifting and lifting axle for the brake installation
42 Shift lever for a manual brake
43 Electromagnetic actuator
44 Resetting spring for the shifting and lifting axle 41
45 Brake shoe
46 Brake spring
47 Spaces for power storage units (electrical accumulators)
48 Resetting bolt for the shifting axle 41, after an emergency stop
49 External guide webs for the shifting axle 41, having a slot
50 Controlling and measuring apparatus

The invention claimed is:

1. A driverless transport system for the safe transportation of heavy loads in the form of loaded carriages which are movable on casters, comprising a transport vehicle comprising:
    a vehicle housing (40) comprising
        a central lifting pin (15), a left lifting pin (28), and a right lifting pin (20) for receiving and transporting a carriage (1) comprising a docking cross beam (5) which is integrated in the carriage (1),
        wherein the central lifting pin (15) is positioned in a center of the vehicle housing (40), wherein the left (28) and right (20) lifting pins are on opposite sides of the central lifting pin (15), and where each of the central (15), left (28), and right (20) lifting pins extends upward,
        a pressure spring (34) having the central lifting pin (15) at one end and a lifting spindle (23) at the opposing end, wherein the lifting spindle (23) comprises a pressure plate (27) in contact with the left (28) and right (20) lifting pins;

two drive wheels (7), each on a dedicated mounted rotation axle, which are independently drivable on either side of the center of the vehicle housing (40) by one drive (16) each, wherein a rotary encoder (33) is provided on each drive wheel (7), wherein support wheels (19) in each case in pairs are provided on the front side and on the rear side of the vehicle housing (40), and wherein at least one laser scanner (2) is installed in an external region of the vehicle housing (40);

a drive motor for driving the lifting spindle (23) upward, whereby the pressure spring (34) presses the central lifting pin (15) into a central opening of the docking cross beam (5), and the pressure plate (27) presses the left lifting pin (28) and the right lifting pin (20) into corresponding further openings of the docking cross beam (5), wherein a system for supplying energy to the transport vehicle comprising an induction current pick-up (39) is provided; and an emergency-stop system comprising emergency off-switches (9) on the transport vehicle, and emergency off-switches (8) on the carriage (1), wherein a pressure-loaded brake shoe (45) on each caster (3) of the carriage (1) is configured to simultaneously release upon actuation of the emergency off-switches to lock the caster (3).

2. The transport system as claimed in claim 1, wherein the docking cross beam (5) comprises a docking cross brace (6) which enables receiving the carriage (1) in a position of the transport vehicle that is rotated about a right angle.

3. The transport system as claimed in claim 1, wherein the pressure spring (34) concentrically encloses a further pressure spring (32) which provides higher contact pressure on the carriage (1).

4. The transport system as claimed in claim 1, wherein the carriage (1) further comprises a brake system (37, 42) comprising:
a shifting and lifting axle (41) disposed transverse to the lifting pins, a resetting spring (44) at one end of the shifting and lifting axle, and an electromagnetic actuator (43) at the opposing end of the shifting and lifting axle;
a shift lever (14) pivotably coupled to the brake (42) at one end and having a slot configured to receive a cross-section of the shifting and lifting axle (41) at the opposing end; and
a brake cable (11) in communication with the shift lever (14) and the pressure-loaded brake shoe (45) on each caster (3),
wherein (i) when in an engaged position, the central lifting pin (15) pushes the shifting and lifting axle upward so that the slot in the shift lever (14) has no effect; and (ii) when in a disengaged position during an emergency stop, the shift lever (14) pivots and the slot slides over the shifting and lifting axle, which causes the brake cable (11) to press the brake shoe (45) onto the caster (3).

5. The transport system as claimed in claim 1, wherein the at least one laser scanner (2) and rotary encoder (33) on each drive wheel are adapted to calculate a slippage for each drive wheel (7).

6. A method for operating a driverless transport system for the transportation of heavy loads in the form of loaded carriages which are movable on casters, the method comprising:
providing a transport vehicle comprising a vehicle housing (40) comprising
a central lifting pin (15), a left lifting pin (28), and a right lifting pin (20) for receiving and transporting a carriage (1) by a docking cross beam (5) which is integrated in the carriage (1),
wherein the central lifting pin (15) is positioned in a center of the vehicle housing (40), wherein the left (28) and right (20) lifting pins are on opposite sides of the central lifting pin (15), and where each of the central (15), left (28), and right (20) lifting pins extends upward,
a pressure spring (34) having the central lifting pin (15) at one end and a lifting spindle (23) at the opposing end, wherein the lifting spindle (23) comprises a pressure plate (27) in contact with the left (28) and right (20) lifting pins;
comprising two drive wheels (7), each on an independently mounted rotation axle, which are independently driven on either side of the center of the vehicle housing (38) by one drive (16) each;
moving the vehicle housing (40) below a carriage (1), determining openings in the docking cross beam (5), and
deploying the central lifting pin (15), the left lifting pin (28), and the right lifting pin (20) into these openings, wherein a drive motor for driving the lifting spindle (23) upward causes the pressure spring (34) to press the central lifting pin (15) into a central opening of the docking cross beam (5), and the pressure plate (27) presses the left lifting pin (28) and the right lifting pin (20) into corresponding further openings of the docking cross beam (5),
wherein at least one laser scanner (2) is provided for orientation;
optionally triggering an emergency stop by engaging an emergency off-switch (8, 9) to activate brakes, and, if activated, releasing the brakes prior to onward travel;
transporting the carriage (1) onward to a destination, and releasing the carriage (1).

7. The method as claimed in claim 6, wherein a contact pressure of the lifting pins (28, 15, 20) depends on the payload of the carriage (1).

8. The method as claimed in claim 6, wherein the docking cross beam (5) comprises a docking cross brace (6) which allows alignment of the carriage (1) in two mutually perpendicular directions.

9. The method as claimed in claim 6, further comprising determining a weight of the loaded carriage.

10. The method as claimed in claim 6, further comprising calculating a slippage for each drive wheel (7), wherein the slippage is calculated by a laser scanner (2) in conjunction with a rotary encoder (33) on each drive wheel.

11. A computer program having a programming code for carrying out the method steps as claimed in claim 6, wherein the program is executed using a computer.

12. A machine-readable carrier having the programming code of a computer program for carrying out the method as claimed in claim 6, wherein the program is executed using a computer.

* * * * *